United States Patent
Cai et al.

(10) Patent No.: US 8,861,404 B2
(45) Date of Patent: *Oct. 14, 2014

(54) STORING ACCESS NETWORK INFORMATION FOR AN IMS USER IN A SUBSCRIBER PROFILE

(75) Inventors: Yigang Cai, Naperville, IL (US); Alok Sharma, Lisle, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

This patent is subject to a terminal disclaimer.

(21) Appl. No.: 13/565,254

(22) Filed: Aug. 2, 2012

(65) Prior Publication Data

US 2012/0307734 A1 Dec. 6, 2012

Related U.S. Application Data

(63) Continuation of application No. 11/761,145, filed on Jun. 11, 2007, now Pat. No. 8,265,090.

(51) Int. Cl.
*H04Q 7/00* (2006.01)
*H04L 29/08* (2006.01)
*H04L 29/06* (2006.01)
*H04L 29/12* (2006.01)

(52) U.S. Cl.
CPC ......... *H04L 67/306* (2013.01); *H04L 29/12188* (2013.01); *H04L 65/1073* (2013.01); *H04L 65/1016* (2013.01); *H04L 61/1588* (2013.01)
USPC ........... 370/259; 370/353; 370/400; 370/410; 370/426; 455/453.1; 455/436; 455/440

(58) Field of Classification Search
USPC ................... 370/352, 400, 410, 259, 426; 455/453.1, 436, 440
See application file for complete search history.

(56) References Cited

U.S. PATENT DOCUMENTS

2008/0020704 A1* 1/2008 Costa et al. ................ 455/3.06
2008/0274739 A1* 11/2008 Wu ............................ 455/435.1

* cited by examiner

*Primary Examiner* — Patrick Edouard
*Assistant Examiner* — Julio Perez
(74) *Attorney, Agent, or Firm* — Duft Bornsen & Fettig, LLP

(57) ABSTRACT

IMS networks and methods are disclosed for storing information on the access network of a user in a subscriber profile for the user. When a communication device of a user attempts to register with an IMS network, a P-CSCF receives a register request message from the communication device, and identifies access network information for the user. The P-CSCF then transmits another register request message to an S-CSCF that includes the access network information, and the S-CSCF in turn forwards the access network information to an HSS. The HSS then stores the access network information in the subscriber profile for the user. Nodes in the IMS network that retrieve the subscriber profile may acquire the access network information to provide services based on the access network information.

20 Claims, 5 Drawing Sheets

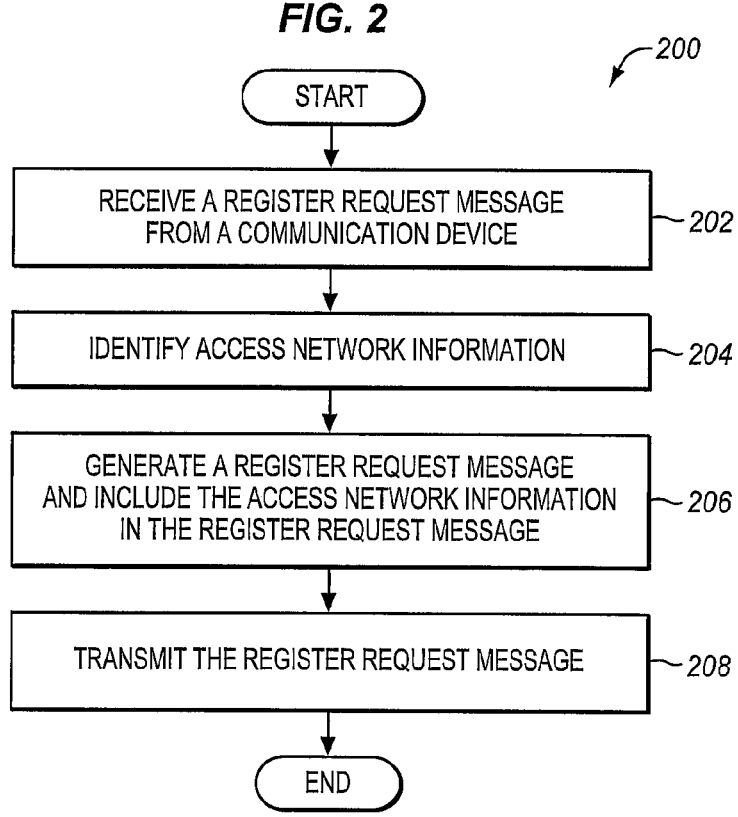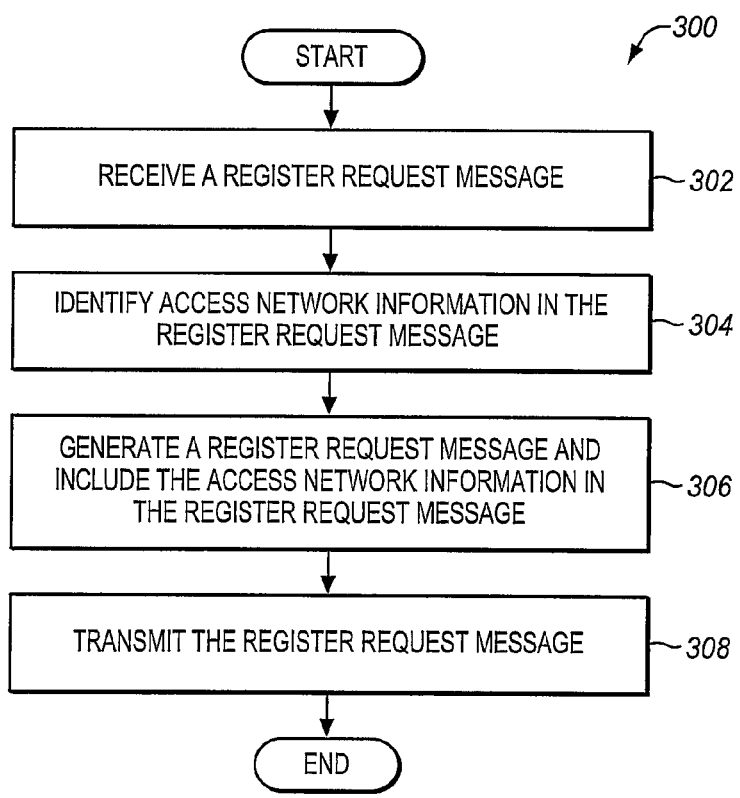

STORING ACCESS NETWORK INFORMATION FOR AN IMS USER IN A SUBSCRIBER PROFILE

RELATED APPLICATIONS

This non-provisional patent application is a continuation of U.S. patent application Ser. No. 11/761,145 filed on Jun. 11, 2007 now U.S. Pat. No. 8,265,090, which is incorporated herein by reference.

BACKGROUND OF THE INVENTION

1. Field of the Invention

The invention is related to the field of communication networks and, in particular, to IMS networks that store information on the access network of a user in a subscriber profile for the user.

2. Statement of the Problem

One type of communication network gaining popularity is an IP Multimedia Subsystem (IMS) network. As set forth in the $3^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost savings bearer network to transmit video, voice, and data. Service providers are accepting this architecture in next generation network evolution.

Before a communication device receives service from an IMS network, the communication device attempts to register with the IMS network. To register according to 3GPP standards, the communication device transmits a register request message, such as a SIP REGISTER message, to a Proxy-Call Session Control Function (P-CSCF) through the appropriate access network. The P-CSCF identifies the home network for the communication device, and then transmits another register request message to a Serving-Call Session Control Function (S-CSCF) in the home network of the user. Responsive to the register request message, the S-CSCF generates an authentication request message, such as a Diameter Multimedia Authentication Request (MAR) message, and transmits the authentication request message to a Home Subscriber Server (HSS). The HSS then authenticates the communication device using the AKA authentication method or another type of authentication method. If the communication device is authenticated, then the S-CSCF generates a subscriber profile request message, such as a Diameter Server Assignment Request (SAR) message, and transmits the subscriber profile request message to the HSS. Responsive to the subscriber profile request message, the HSS identifies the subscriber profile for the user of the communication device. The HSS then transmits a response message, such as a Diameter Server Assignment Answer (SAA) message, to the S-CSCF that includes the subscriber profile for the user of the communication device. The S-CSCF may then process the subscriber profile to provide services for the communication device.

Some communication devices are able to identify information on the access network through which they are communicating, and include the access network information in the register request message to the P-CSCF. For example, a WiFi access point may broadcast its MAC address to all communication devices within its service area. A communication device in range of the WiFi access point may identify the MAC address of the WiFi access point and embed the MAC address in the register request message to the P-CSCF.

One problem with present IMS networks is that if the P-CSCF receives access network information from a communication device, the P-CSCF does not forward the access network information to other nodes in the IMS network, such as the S-CSCF and the HSS. According to the 3GPP standards, the registration process by the S-CSCF and the HSS involves authenticating the user. As such, there is no suggestion to forward the access network information to the S-CSCF and the HSS during registration, as this information is not presently used to authenticate the user. As a result, the access network information is not presently provided to other nodes in the IMS network, such as the S-CSCF and the HSS, and is not presently stored in the subscriber profile of a user. The access network information may be useful for providing other features or services in the IMS network, but is unfortunately not utilized in present IMS networks.

SUMMARY OF THE SOLUTION

Embodiments of the invention solve the above and other related problems by forwarding the access network information for a user to the S-CSCF and/or the HSS in the IMS network during registration, and storing the access network information in a subscriber profile for the user. The S-CSCF and/or the HSS may then use the access network information from the subscriber profile to provide services or features in the IMS network that were not previously provided in IMS networks. For instance, the S-CSCF may identify a geographic location and/or time zone for the user based on the access network information in the subscriber profile to provide one or more services in the IMS network. The S-CSCF may identify that the user is roaming based on the access network information in the subscriber profile to provide a service in the IMS network. The S-CSCF may identify a handoff based on the access network information in the subscriber profile to provide a service in the IMS network. These services or features are advantageously available due to the access network information being provided to the S-CSCF and/or the HSS in the subscriber profile, as this information was not previously available to these network nodes.

In one embodiment, an IMS network includes a P-CSCF, an S-CSCF, and an HSS. When a communication device of a user attempts to register with the IMS network, the network operates as follows. The P-CSCF receives a register request message from the communication device, such as a SIP REGISTER message. The P-CSCF identifies access network information for an access network providing service to the communication device, generates another register request message, and embeds or otherwise includes the access network information in the register request message. The P-CSCF then transmits the register request message for receipt by the S-CSCF.

The S-CSCF receives the register request message, and identifies the access network information in the message. The S-CSCF generates a register request message, embeds or otherwise includes the access network information in the register request message, and transmits the register request message for receipt by the HSS.

The HSS receives the register request message from the S-CSCF, identifies the access network information in the register request message, and stores the access network information in the subscriber profile for the user. Any node in the IMS network that retrieves the subscriber profile for the user may advantageously acquire the access network information to provide services. The network nodes cannot presently provide these same services, as the access network information is not presently available to the network nodes.

The invention may include other exemplary embodiments described below.

DESCRIPTION OF THE DRAWINGS

The same reference number represents the same element or same type of element on all drawings.

FIG. 2 is a flow chart illustrating a method of operating a P-CSCF during registration in an exemplary embodiment of the invention.

FIG. 3 is a flow chart illustrating a method of operating an S-CSCF during registration in an exemplary embodiment of the invention.

DETAILED DESCRIPTION OF THE INVENTION

FIGS. 1-6 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
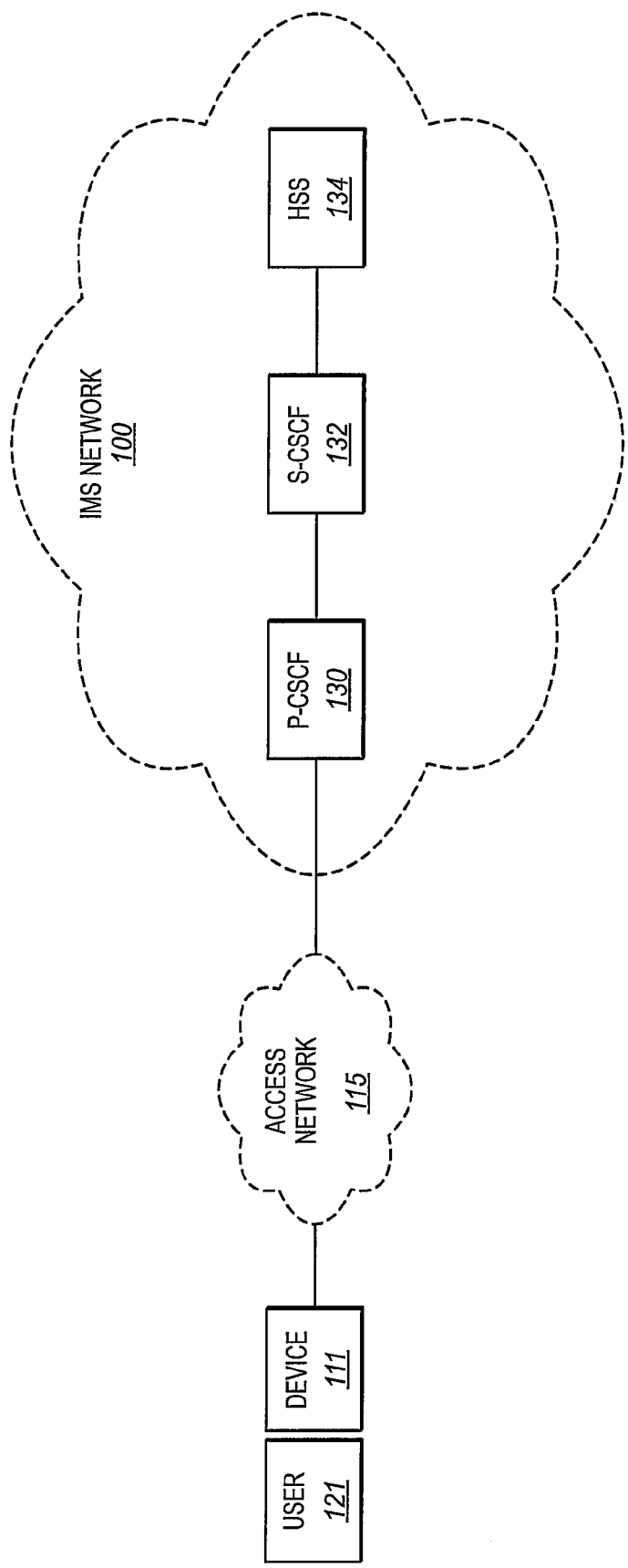
FIG. 1 illustrates an IMS network in an exemplary embodiment of the invention.

FIG. 1 illustrates an IMS network 100 in an exemplary embodiment of the invention. IMS network 100 includes a Proxy-Call Session Control Function (P-CSCF) 130, a Serving-Call Session Control Function (S-CSCF) 132, and a Home Subscriber Server (HSS) 134. A P-CSCF comprises any server(s), function(s), or other system adapted to act as the initial interface (e.g., SIP Server) between a communication device and IMS network 100. An S-CSCF comprises any server(s), function(s), or other system adapted to provide session control for subscribers accessing services within IMS network 100. An HSS comprises any system or database adapted to store subscriber information, such as subscriber profiles. IMS network 100 may include other network nodes not shown in FIG. 1, such as an Interrogate-CSCF (I-CSCF), one or more application servers, etc.

IMS network 100 is adapted to provide communication service to a communication device 111 through an access network 115. Device 111 is being operated by a user 121. Device 111 may be a SIP-enabled device or another type of device adapted to communicate with IMS network 100 through access network 115. Device 111 may comprise a wireline device, or a wireless device. Also, access network 115 may comprise a wireline network or a wireless network. A wireline access network may comprise an Ethernet network or another type of wireline network. A wireless access network may comprise a WiFi network, a WiMAX network, or another type of WLAN using protocols such as 802.11b, 802.11g, or Bluetooth. A wireless access network may alternatively comprise a cellular network, such as a CDMA or a GSM network.

In FIG. 1, assume that device 111 attempts to register with IMS network 100. The registration of device 111 may be responsive to device 111 initially powering up, responsive to device 111 traveling into a service area of access network 115, responsive to device 111 re-registering with IMS network 100, etc. For the registration process, device 111 is programmed to generate a register request message, such as a SIP REGISTER message, and to transmit the register request message to P-CSCF 130 through access network 115. IMS network 100 operates as follows responsive to the register request message.

FIG. 2 is a flow chart illustrating a method 200 of operating P-CSCF 130 during registration in an exemplary embodiment of the invention. The steps of method 200 will be described with reference to IMS network 100 in FIG. 1. The steps of the flow chart in FIG. 2 are not all inclusive and may include other steps not shown.

In step 202 of method 200, P-CSCF 130 receives the register request message from device 111. In step 204, P-CSCF 130 identifies access network information for access network 115 that is providing service to device 111. Access network information comprises any data, identifiers, or other information regarding access network 115. For example, the access network information may comprise an access network identifier (ID) (e.g., a MAC address), a local WiFi address, a switch/circuit ID, an MSC ID/sector ID, a serving System ID (SID) and Network ID (NID), etc. In another example, the access network information may comprise an access network type, such as a WLAN, a cellular network, a wireline network, etc. In another example, the access network information may comprise a service provider ID.

P-CSCF 130 may identify the access network information in a variety of ways. P-CSCF 130 may receive the access network information in the register request message from device 111. For instance, device 111 may receive information from access network 115, such as an access network ID, an access network type, a service provider ID, etc. Device 111 may then embed the access network information in the register request message, and transmit the message to P-CSCF 130. P-CSCF 130 may then identify the access network information by processing the proper parameters of the register request message. P-CSCF 130 may alternatively receive access network information from an IP gateway (e.g., a PDSN in a CDMA network or a GGSN in a GSM or UMTS network) of a cellular network. P-CSCF 130 may alternatively query a database or nodes in access network 115 to identify the access network information.

In step 206, P-CSCF 130 generates a register request message and embeds or otherwise includes the access network information in the register request message. For instance, P-CSCF 130 may generate a SIP REGISTER message, and may embed the access network information in a P-Access-Network-Info parameter in the SIP REGISTER message. In step 208, P-CSCF 130 transmits the register request message for receipt by S-CSCF 132. When "generating" a register request message, P-CSCF 130 may actually generate a new register request message or reuse the register request message received from device 111. In other words, P-CSCF 130 may generate and transmit a new register request message for receipt by S-CSCF 132, or may update or change the received register request message and forward the register request message for receipt by S-CSCF 132. The register request messages are referred to herein as new or different messages even though the same register request message may be used with different header data.

FIG. 3 is a flow chart illustrating a method 300 of operating S-CSCF 132 during registration in an exemplary embodiment of the invention. The steps of method 300 will be described with reference to IMS network 100 in FIG. 1. The steps of the flow chart in FIG. 3 are not all inclusive and may include other steps not shown.

In step 302 of method 300, S-CSCF 132 receives the register request message from P-CSCF 130. In step 304, S-CSCF 132 identifies the access network information in the register request message. In step 306, S-CSCF 132 generates a register request message and embeds or otherwise includes the access network information in the register request message. As an example, S-CSCF 132 may generate a Diameter Server Assignment Request (SAR) message, and embed the access network information in the SAR message. In step 308, S-CSCF 132 transmits the register request message for receipt by HSS 134.

Figure 4:
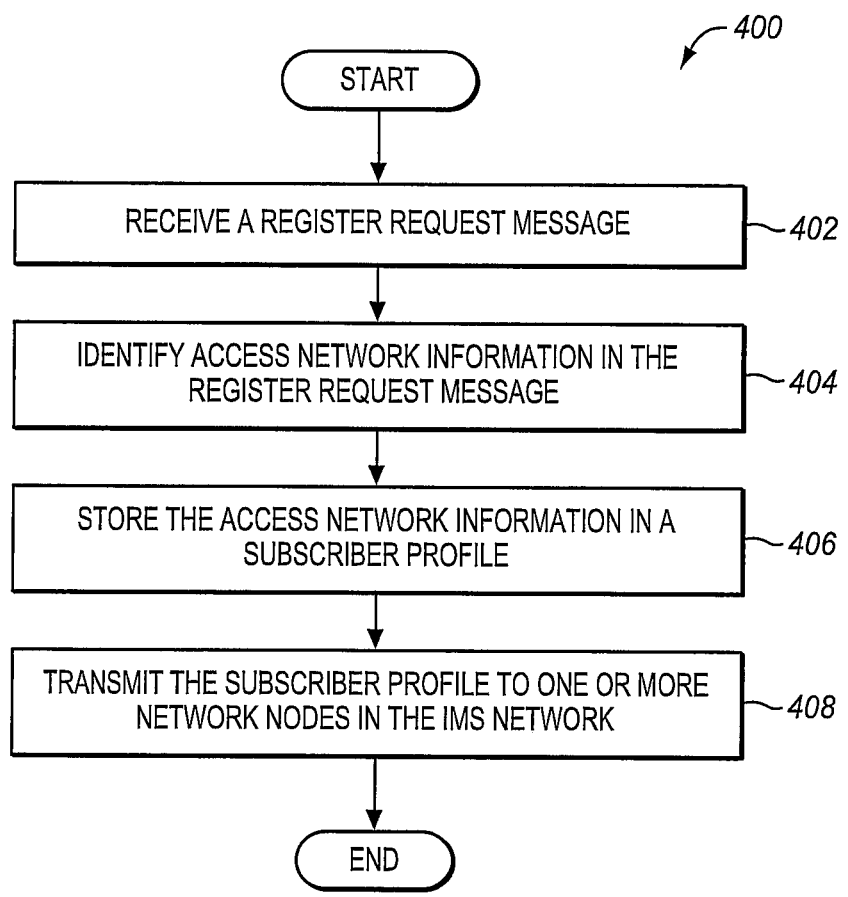
FIG. 4 is a flow chart illustrating a method of operating an HSS during registration in an exemplary embodiment of the invention.

FIG. 4 is a flow chart illustrating a method 400 of operating HSS 134 during registration in an exemplary embodiment of the invention. The steps of method 400 will be described with reference to IMS network 100 in FIG. 1. The steps of the flow chart in FIG. 4 are not all inclusive and may include other steps not shown.

In step 402 of method 400, HSS 134 receives the register request message from S-CSCF 132. In step 404, HSS 134 identifies the access network information in the register request message. In step 406, HSS 134 stores the access network information in a subscriber profile for user 121. A subscriber profile (also referred to as a user profile or a service profile) comprises any set of data or parameters describing the user, services subscribed to by the user, etc. HSS 134 typically stores some information from the register request message in the subscriber profile, such as a PRID for user 121, a PUID for user 121, and an S-CSCF ID. In this embodiment, HSS 134 additionally stores access network information in the subscriber profile that was included in the register request message. This access network information was not previously stored in the subscriber profile for user 121 or available to HSS 134.

Method 400 may also include the step 408, where HSS 134 transmits the subscriber profile, which includes the access network information, to other network nodes in IMS network 100. For instance, if S-CSCF 132 transmits a Diameter Server Assignment Request (SAR) message to HSS 134, then HSS 134 may respond with a Server Assignment Answer (SAA) message. The SAA message includes the subscriber profile for user 121, where the subscriber profile includes the access network information.

Responsive to receiving the subscriber profile that includes the access network information, a network node in IMS network 100 may provide one or more services or features based on the access network information. In one example, S-CSCF 132 may receive the subscriber profile from HSS 134, identify the access network information in the subscriber profile, and identify a geographic location and/or time zone for user 121 based on the access network information. The geographic location and/or time zone of user 121 may be used for charging purposes, for providing location based services to user 121, for determining if user 121 is located in a home network or a visited network, for determining if user 121 is roaming, etc.

In another example, S-CSCF 132 may receive the subscriber profile from HSS 134, identify the access network information in the subscriber profile, and identify a type of access network 115 based on the access network information. Types of access network include but are not limited to a WiFi network, a WiMAX network, a CDMA network, a GSM network, an Ethernet network, etc. The type of access network may be used for charging purposes, for determining what services to implement, etc.

In another example, S-CSCF 132 may receive the subscriber profile from HSS 134, identify the access network information in the subscriber profile, and identify a handoff based on the access network information. For example, assume that the access network information initially indicated that access network 115 was a WiFi network having a MAC address of 00BA5550EEFF. Later, S-CSCF 132 identifies that the access network information now indicates that access network 115 is a cellular network having an MSC ID of AAABBB000. S-CSCF 132 may thus determine that a handoff has occurred from the WiFi network to the cellular network based on the access network information.

In another example, S-CSCF 132 may receive the subscriber profile from HSS 134, identify the access network information in the subscriber profile, and screen or validate a call based on the access network information. For instance, assume that S-CSCF 132 receives a signaling message for a call involving device 111. Responsive to receiving this signaling message, S-CSCF 132 may identify the access network information in the subscriber profile, and also identify access network information in the signaling message for the call. S-CSCF 132 may then compare the access network information in the subscriber profile and the access network information in the signaling message. If the access network information matches, then S-CSCF 132 may allow the call to continue. If the access network information does not match, then S-CSCF 132 may release the call because of the suspicious nature of the call originating from an access network that is different than the access network of registration. S-CSCF 132 may perform other call screening or call validation methods using the access network information in the subscriber profile.

EXAMPLE

Figure 5:
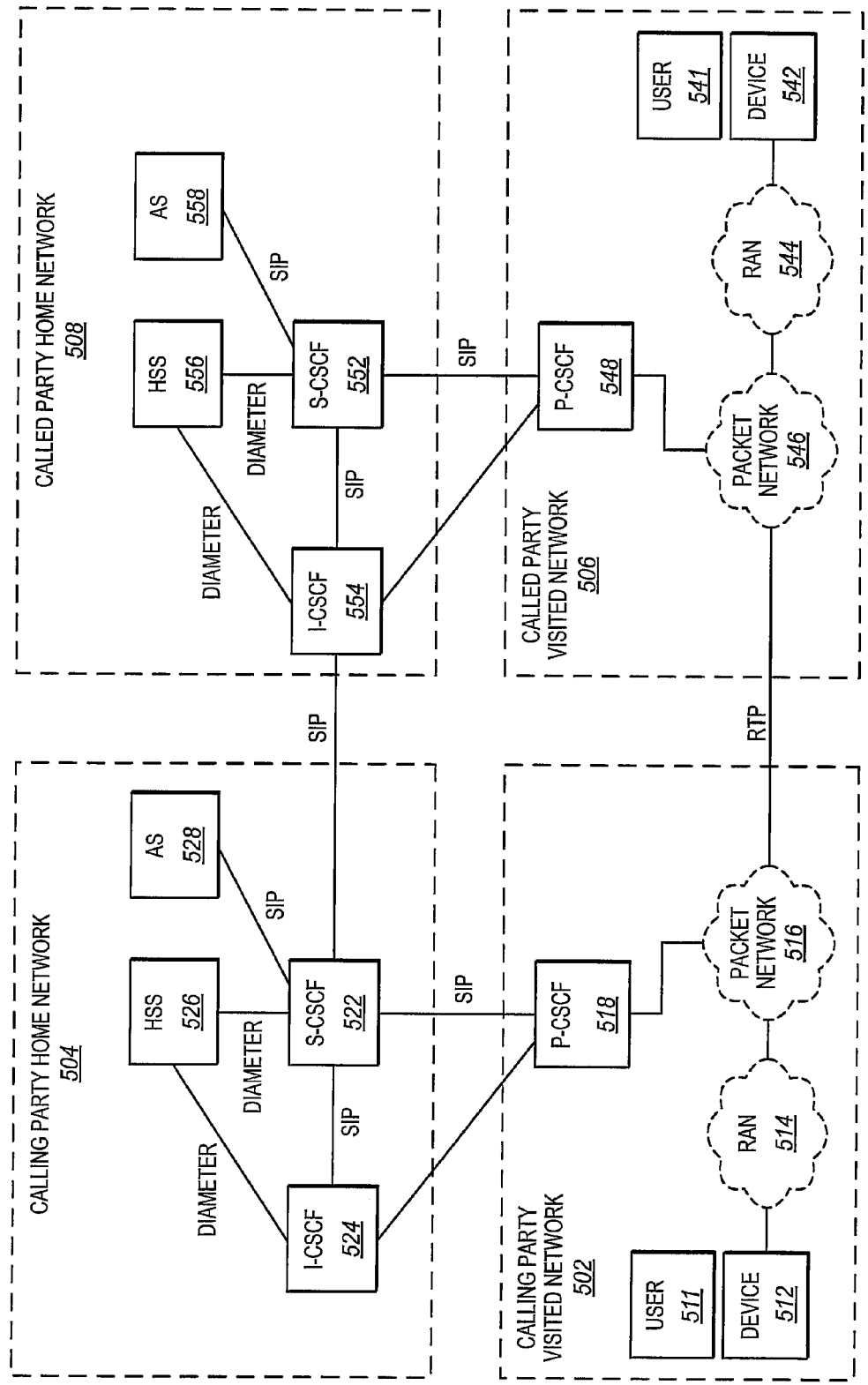
FIG. 5 illustrates an IMS network in an exemplary embodiment of the invention.
Figure 6:
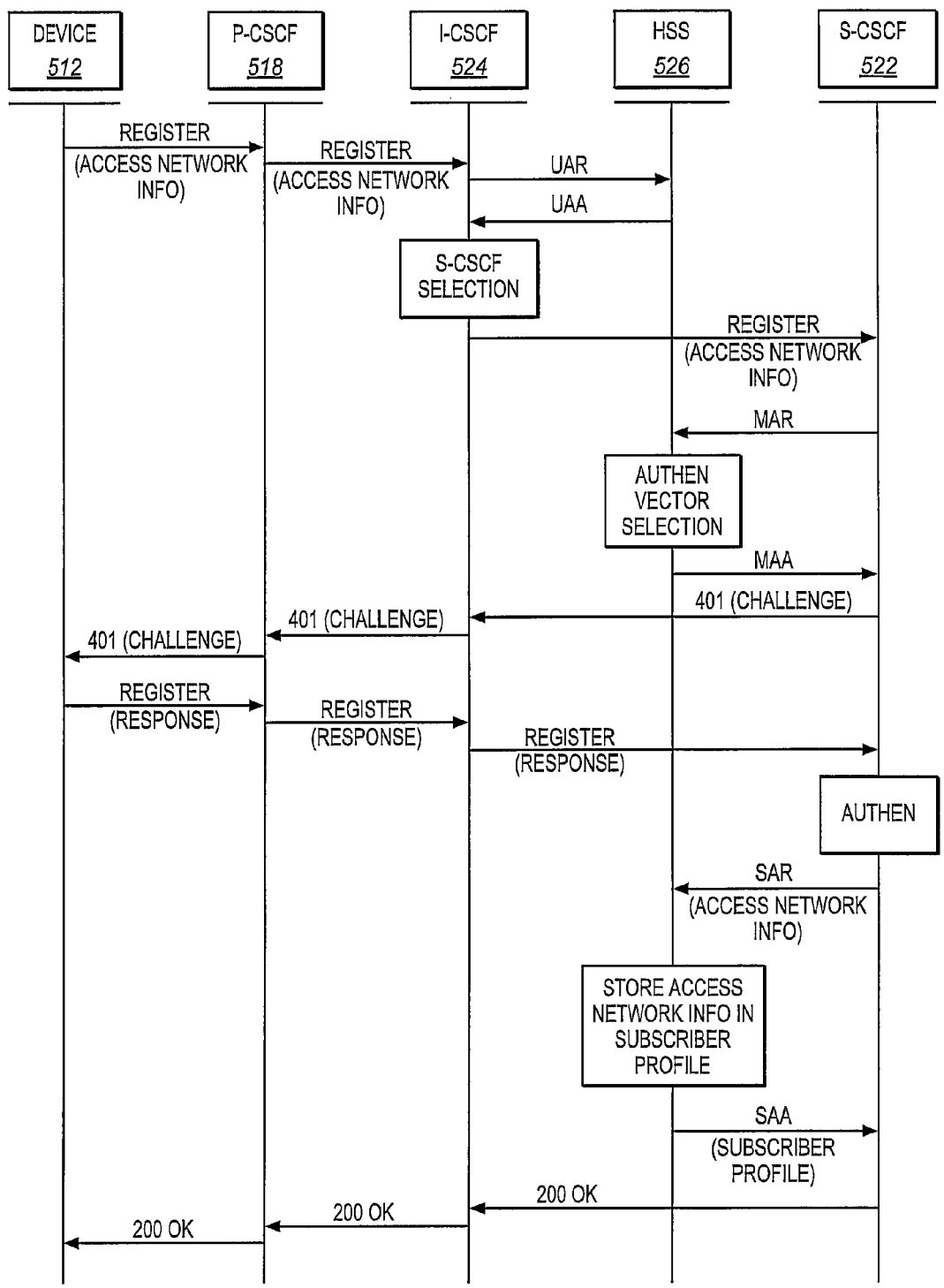
FIG. 6 is a message diagram illustrating messaging used to store access network information during the registration process in an exemplary embodiment of the invention.

FIGS. 5-6 illustrate an example of operating an IMS network to store access network information for a user of a communication device in a subscriber profile for the user. FIG. 5 illustrates an IMS network 500 in an exemplary embodiment of the invention. IMS network 500 includes calling party visited network 502, a calling party home network 504, a called party visited network 506, and a called party home network 508. Calling party visited network 502 includes a mobile device 512, a Radio Access Network (RAN) 514, a packet network 516, and a P-CSCF 518. Mobile device 512 is being operated by user 511. Calling party home network 504 includes an S-CSCF 522, an Interrogate-CSCF (I-CSCF) 524, an HSS 526, and an application server (AS) 528. Called party visited network 506 includes a mobile device 542, a RAN 544, a packet network 546, and a P-CSCF 548. Mobile device 542 is being operated by user 541. Called party home network 508 includes an S-CSCF 552, an I-CSCF 554, an HSS 556, and an application server (AS) 558. IMS network 500 may include other nodes that are not illustrated in FIG. 5 for the sake of brevity.

In FIG. 5, assume that mobile device 512 powers on or moves into a service area of RAN 514. Mobile device 512 is programmed to register with IMS network 500 in order to receive communication service. In this example, IMS network 500 is adapted to store access network information during the registration process in HSS 526.

FIG. 6 is a message diagram illustrating messaging used to store access network information during the registration process in an exemplary embodiment of the invention. The message diagram illustrates SIP and Diameter messaging used within IMS network 500. To begin, device 512 generates a SIP REGISTER message in order to register with IMS network 500. Device 512 also identifies access network information for RAN 514, such as an access network type and an access network ID. Assume for this embodiment that RAN 514 comprises a WLAN having an address ID of 00BA5550EEFF. Responsive to identifying the access network information, device 512 embeds the access network information in the P-Access-Network-Info parameter of the REGISTER message. Device 512 then transmits the REGISTER message to P-CSCF 518 through RAN 514 and packet network 516.

The following is an example of a REGISTER message that is transmitted from device 512 to P-CSCF 518. The access network information in the SIP REGISTER message is indicated in bold. The access network information indicates that RAN 514 comprises a WLAN and that the MAC address of the RAN 514 (or a wireless access point in RAN 514) is 00BA5550EEFF.

```
REGISTER sip:registrar.home1.net SIP/2.0
Via: SIP/2.0/UDP
[5555::aaa:bbb:ccc:ddd];comp=sigcomp;branch=z9hG4bKnashds7
   Max-Forwards: 70
   P-Access-Network-Info: wlan-mac-addr=00BA5550EEFF
   From: <sip:user1_public1@home1.net>;tag=4fa3
   To: <sip:user1_public1@home1.net>
   Contact:
   <sip:[5555::aaa:bbb:ccc:ddd];comp=sigcomp>;expires=600000
   Call-ID: apb03a0s09dkjdfglkj49111
   Authorization: Digest username="user1_private@home1.net",
realm="registrar.home1.net", nonce="", uri="sip:registrar.home1.net",
response=""
   Security-Client: ipsec-3gpp; alg=hmac-sha-1-96; spi-c=23456789;
   spi-s=12345678;
port-c=2468; port-s=1357
   Require: sec-agree
   Proxy-Require: sec-agree
   CSeq: 1 REGISTER
   Supported: path
   Content-Length: 0
```

P-CSCF 518 receives the REGISTER message from device 512, and processes the REGISTER message to identify the access network information embedded in the P-Access-Network-Info parameter. Based on a URI for user 511, P-CSCF 518 also determines that device 512 is registering from a visited network 502 and performs DNS queries to locate I-CSCF 524 in the home network 504. The look up in the DNS is based on the address specified in the Request URI ("registrar.home1.net"). P-CSCF 518 then populates the P-Access-Network-Info parameter of the REGISTER message with the access network information. P-CSCF 518 also populates the icid-value field of the P-Charging-Vector parameter with an IMS charging ID for user 511, and populates the orig-IOI field in P-Charging-Vector parameter with a value that identifies an original carrier of user 511. P-CSCF 518 then transmits the REGISTER message to the address indicated in the Request-URI. When transmitting the REGISTER message, P-CSCF 518 specifies the protocol, port number, and IP address of I-CSCF 524 in the home network 504 to which to send the REGISTER message.

The following is an example of a REGISTER message that is transmitted from P-CSCF 518 to I-CSCF 524. The access network information in the SIP REGISTER message is indicated in bold. This access network information was not previously included in the REGISTER message from P-CSCF 518 to I-CSCF 524.

```
REGISTER sip:registrar.home1.net SIP/2.0
   Via: SIP/2.0/UDP pcscf1.visited1.net;branch=z9hG4bK240f34.1,
   SIP/2.0/UDP
[5555::aaa:bbb:ccc:ddd];comp=sigcomp;branch=z9hG4bKnashds7
   Max-Forwards: 69
   P-Access-Network-Info: wlan-mac-addr=00BA5550EEFF
   Path: <sip:term@pcscf1.visited1.net;lr>
   Require: path
   P-Visited-Network-ID: "Visited Network Number 1"
   P-Charging-Vector: icid-value="1234bc9867e"; orig-ioi="home1.net"
   From:
   To:
   Contact:
   Call-ID:
   Authorization: Digest username="user1_private@home1.net",
realm="registrar.home1.net", nonce="", uri="sip:registrar.home1.net",
response="",
      integrity-protected="no"
      CSeq:
      Supported:
      Content-Length:
```

I-CSCF 524 receives the REGISTER message from P-CSCF 518. Responsive to receiving the REGISTER message, I-CSCF 524 generates a Diameter User Authentication Request (UAR) message and transmits the UAR message to HSS 526. HSS 526 then responds to the UAR message with a Diameter User Authentication Answer (UAA) message. Responsive to receiving the UAA message, I-CSCF 524 selects the S-CSCF 522 to serve mobile device 512. I-CSCF 524 then transmits the SIP REGISTER message to S-CSCF 522. The P-Access-Network-Info parameter and the P-Charging-Vector parameter of the REGISTER message are populated as described above with the access network information.

S-CSCF 522 receives the REGISTER message from I-CSCF 524. Responsive to receiving the REGISTER message, S-CSCF 522 generates a Diameter Multimedia Authentication Request (MAR) message to continue the process of registering device 512. S-CSCF 522 includes a private identifier (PRID) and/or a public identifier (PUID) in the MAR message, and transmits the MAR message to HSS 526.

HSS 526 processes the PRID in the MAR message to generate an AKA vector based on the AKA authentication method. HSS 526 then generates a Diameter Multimedia Authentication Answer (MAA) message in response to the MAR message, and includes the AKA vector in the MAA message such as in the SIP-Authenticate AVP of the MAA. Responsive to receiving the MAA message, S-CSCF 522 transmits a SIP 401 (Challenge) message to mobile device 512 (through P-CSCF 518, packet network 516, and RAN 514) to challenge mobile device 512 for an authentication check. Mobile device 512 receives the 401 message, and calculates the authentication response. Mobile device 512 then generates another SIP REGISTER message and transmits the REGISTER message back to S-CSCF 522. Responsive to receiving the REGISTER message, S-CSCF 522 processes the authentication response in relation to the authentication vector to determine whether mobile device 512 is authenticated.

If mobile device 512 is authenticated, then S-CSCF 522 generates a Diameter Server Assignment Request (SAR)

message to retrieve the subscriber profile for user 511 of mobile device 512 from HSS 526. S-CSCF 522 embeds the access network information from the REGISTER message in the SAR message. For instance, S-CSCF 522 may embed the access network ID from the P-Access-Network-Info parameter of the REGISTER message and the originating 101 from the P-Charging-Vector parameter of the REGISTER message in the SAR message. S-CSCF 522 then transmits the SAR message to HSS 526.

Responsive to receiving the SAR message, HSS 526 identifies the subscriber profile for user 511 based on the PUID for user 511. HSS 526 also identifies the access network information that was embedded in the SAR message. HSS 526 then stores the access network information from the SAR message in the subscriber profile. HSS 526 generates a Diameter Server Assignment Answer (SAA) message, and includes the subscriber profile for user 511 in the SAA message. HSS 526 then transmits the SAA message to S-CSCF 522.

Responsive to receiving the SAA message, S-CSCF 522 generates a SIP 200 OK message and transmits the 200 OK message to mobile device 512 (through P-CSCF 518, packet network 516, and RAN 514). S-CSCF 522 also processes the SAA message to identify the subscriber profile for user 511. S-CSCF 522 may then use the access network information included in the subscriber profile to provide services for user 511. For instance, S-CSCF 522 may identify a geographic location and/or time zone for user 511 based on the access network information stored in the subscriber profile. The geographic location and/or time zone of user 511 may be used for charging purposes, for providing location based services to user 511, for determining if user 511 is located in home network 504 or visited network 502, for determining if user 511 is roaming, etc.

Although specific embodiments were described herein, the scope of the invention is not limited to those specific embodiments. The scope of the invention is defined by the following claims and any equivalents thereof

We claim:

1. A system comprising:
a Serving-Call Session Control Function (S-CSCF) of an IP Multimedia Subsystem (IMS) network, the S-CSCF configured to receive a first register request sent by a Proxy-Call Session Control Function (P-CSCF) when a communication device of a user attempts to register with the IMS network;
the S-CSCF is further configured to identify access network information inserted in the first register request, to insert the access network information in a second register request, and to transmit the second register request to a Home Subscriber Server (HSS) for storing the access network information in a subscriber profile for the user;
the S-CSCF is further configured to receive the subscriber profile from the HSS, and to identify a geographic location for the user based on the access network information in the subscriber profile.

2. The system of claim 1 wherein:
the first register request comprises a Session Initiation Protocol (SIP) REGISTER message; and
the S-CSCF is further configured to identify the access network information in a P-Access-Network-Info parameter of the SIP REGISTER message.

3. The system of claim 1 wherein:
the second register request comprises a Diameter Server Assignment Request (SAR) message.

4. The system of claim 1 wherein:
the S-CSCF is further configured to identify a time zone for the user based on the access network information in the subscriber profile.

5. The system of claim 1 wherein:
the S-CSCF is further configured to identify that the user is roaming based on the access network information in the subscriber profile.

6. The system of claim 1 wherein:
the S-CSCF is further configured to identify a type of access network that serves the communication device based on the access network information in the subscriber profile.

7. The system of claim 1 wherein:
the S-CSCF is further configured to identify a handoff based on the access network information in the subscriber profile.

8. The system of claim 1 wherein:
the S-CSCF is further configured to receive a signaling message for a session involving the communication device of the user, to identify the access network information in the subscriber profile, to identify access network information in the signaling message, to compare the access network information in the subscriber profile and the access network information in the signaling message, to allow the session to continue if the access network information in the subscriber profile and the access network information in the signaling message match, and to release the session if the access network information in the subscriber profile and the access network information in the signaling message do not match.

9. The system of claim 1 wherein:
the access network information comprises a network identifier (ID) for a Radio Access Network (RAN) that serves the communication device of the user.

10. The system of claim 1 wherein:
the access network information indicates a type of Radio Access Network (RAN) that serves the communication device of the user.

11. A method comprising:
receiving a first register request in a Serving-Call Session Control Function (S-CSCF) of an IP Multimedia Subsystem (IMS) network sent by a Proxy-Call Session Control Function (P-CSCF) when a communication device of a user attempts to register with the IMS network;
identifying, in the S-CSCF, access network information inserted in the first register request;
inserting, in the S-CSCF, the access network information in a second register request;
transmitting the second register request from the S-CSCF to a Home Subscriber Server (HSS) for storing the access network information in a subscriber profile for the user;
receiving the subscriber profile from the HSS; and
identifying a geographic location for the user based on the access network information in the subscriber profile.

12. The method of claim 11 wherein:
the first register request comprises a Session Initiation Protocol (SIP) REGISTER message; and
the step of identifying access network information inserted in the first register request comprises identifying the access network information in a P-Access-Network-Info parameter of the SIP REGISTER message.

13. The method of claim 11 wherein:
the second register request comprises a Diameter Server Assignment Request (SAR) message.

14. The method of claim 11 further comprising:
identifying a time zone for the user based on the access network information in the subscriber profile.

15. The method of claim 11 further comprising:
identifying that the user is roaming based on the access network information in the subscriber profile.

16. The method of claim 11 further comprising:
identifying a type of access network that serves the communication device based on the access network information in the subscriber profile.

17. The method of claim 11 further comprising:
identifying a handoff based on the access network information in the subscriber profile.

18. The method of claim 11 further comprising:
receiving, in the S-CSCF, a signaling message for a session involving the communication device of the user;
identifying the access network information in the subscriber profile;
identifying access network information in the signaling message;
comparing the access network information in the subscriber profile and the access network information in the signaling message;
allowing the session to continue if the access network information in the subscriber profile and the access network information in the signaling message match; and
releasing the session if the access network information in the subscriber profile and the access network information in the signaling message do not match.

19. The method of claim 11 wherein:
the access network information comprises a network identifier (ID) for a Radio Access Network (RAN) that serves the communication device of the user.

20. The method of claim 11 wherein:
the access network information indicates a type of Radio Access Network (RAN) that serves the communication device of the user.

* * * * *